(12) United States Patent
Paquelet et al.

(10) Patent No.: US 10,965,504 B2
(45) Date of Patent: Mar. 30, 2021

(54) METHOD FOR GENERATING A PULSE-POSITION-MODULATED SIGNAL, DEMODULATION METHOD AND CORRESPONDING COMPUTER PROGRAM PRODUCT AND DEVICES

(71) Applicant: B-COM, Cesson Sevigne (FR)

(72) Inventors: Stephane Paquelet, Rennes (FR); Patrick Savelli, Rennes (FR)

(73) Assignee: B-COM, Cesson Sevigne (FR)

( * ) Notice: Subject to any disclaimer, the term of this patent is extended or adjusted under 35 U.S.C. 154(b) by 32 days.

(21) Appl. No.: 16/307,053

(22) PCT Filed: May 16, 2017

(86) PCT No.: PCT/EP2017/061762
§ 371 (c)(1),
(2) Date: Dec. 4, 2018

(87) PCT Pub. No.: WO2017/211553
PCT Pub. Date: Dec. 14, 2017

(65) Prior Publication Data
US 2019/0229958 A1 Jul. 25, 2019

(30) Foreign Application Priority Data

Jun. 9, 2016 (FR) ...................... 1655325

(51) Int. Cl.
*H04L 25/49* (2006.01)
*H04B 1/717* (2011.01)
(Continued)

(52) U.S. Cl.
CPC ........... *H04L 25/4902* (2013.01); *H04B 1/69* (2013.01); *H04B 1/7174* (2013.01); *H04L 27/2634* (2013.01); *H04B 2001/6912* (2013.01)

(58) Field of Classification Search
None
See application file for complete search history.

(56) References Cited

U.S. PATENT DOCUMENTS

| 5,019,825 A | 5/1991 | McCorkle |
| 8,406,275 B2 | 3/2013 | Sforza |
| 2012/0314730 A1 | 12/2012 | McCorkle et al. |

FOREIGN PATENT DOCUMENTS

| CN | 101309092 A | 11/2008 |
| CN | 102474297 A | 5/2012 |

(Continued)

OTHER PUBLICATIONS

International Search Report dated Jul. 5, 2018 for corresponding International Application No. PCT/EP2017/061762, filed May 16, 2017.

(Continued)

*Primary Examiner* — Jason E Mattis
*Assistant Examiner* — Hong Shao
(74) *Attorney, Agent, or Firm* — David D. Brush; Westman, Champlin & Koehler, P.A.

(57) ABSTRACT

A method for generating a pulse-position-modulated signal. The signal includes a temporal succession of waveforms among Ns waveforms obtained by time shift that is an integer multiple of an elementary time duration Tc. The method includes the following steps executed for a k rank symbol among Ns symbols: obtaining, a set of N modulation coefficients $c_l^{(k)}$, a modulation coefficient of index n, $c_n^{(k)}$, being expressed as the product of a reference modulation coefficient $c_n^{(r)}$ coming from the Fourier series decomposition of a reference waveform associated with a symbol of rank r multiplied by a phase shift term the argument of which is proportional to n; and generating M temporal samples of (Continued)

a k-th waveform carrying the symbol of rank k by Fourier transformation of said set of N modulation coefficients $c_i^{(k)}$.

17 Claims, 5 Drawing Sheets

(51) Int. Cl.
*H04L 27/26* (2006.01)
*H04B 1/69* (2011.01)

(56) References Cited

FOREIGN PATENT DOCUMENTS

| | | |
|---|---|---|
| CN | 102546501 A | 7/2012 |
| CN | 104836773 A | 8/2015 |
| EP | 2449690 A1 | 5/2012 |
| JP | 2011149806 A | 8/2011 |
| WO | 2011000936 A1 | 1/2011 |

OTHER PUBLICATIONS

Written Opinion of the International Searching Authority dated Jul. 5, 2018 for corresponding International Application No. PCT/EP2017/061762, filed May 16, 2017.

Ozdemir et al. "Channel Estimation for Wireless OFDM Systems." IEEE Communications Surveys & Tutorials, vol. 9, No. 2, pp. 18-48, Second Quarter 2007.

Pathak et al. "Channel Estimation in OFDM Systems." International Journal of Advanced Research in Computer Science and Software Engineering, vol. 3, Issue 3, ISSN: 2277 128X. Mar. 2013.

English Translation of Written Opinion of the International Searching Authority dated Jul. 18, 2017 for corresponding International Application No. PCT/EP2017/061762, filed May 16, 2017.

English translation of the Office Action dated Mar. 23, 2020 from the Chinese Patent Office for corresponding Chinese Application No. 201780035696.3.

METHOD FOR GENERATING A PULSE-POSITION-MODULATED SIGNAL, DEMODULATION METHOD AND CORRESPONDING COMPUTER PROGRAM PRODUCT AND DEVICES

CROSS-REFERENCE TO RELATED APPLICATIONS

This Application is a Section 371 National Stage Application of International Application No. PCT/EP2017/061762, filed May 16, 2017, which is incorporated by reference in its entirety and published as WO 2017/211553 A1 on Dec. 14, 2017, not in English.

1 FIELD OF THE INVENTION

The field of the invention is that of the transmission of data via a pulse-position-modulation or PPM.

More specifically, the invention relates to a technique for generating a PPM or pulse-position-modulated signal as well as a technique for demodulating such a received signal, these techniques having characteristics common with the generation and demodulation of other types of waveforms, thus enabling the implementing of an optimized multi-mode transmitter and/or receiver.

Such a PPM-type modulation is widely used in the field of digital communications. In particular, it would seem that the modulation used by the LoRa® technology dedicated to connected things can be interpreted as belonging to the category of PPM modulations. The invention has applications in all fields of personal and professional life where connected things are present, especially but not exclusively in the fields of health, sports, home applications (security, electrical and electronic appliances, etc.), the tracking of things, etc.

2 TECHNOLOGICAL BACKGROUND

Connected things, which are presented as being "the Internet third revolution" are now becoming increasingly prevalent in all fields of daily and corporate life. Most of these things are intended for the production of data through their integrated sensors in order to give value-added services to their owners.

The very applications concerned are such that these connected things are mainly nomadic things. In particular, they should be capable of transmitting data produced regularly or at request to a distant user.

To this end, long-range radio transmission of the mobile cellular radio type (2G/3G/4G, etc.) has been a technology of choice. This technology has indeed made it possible to benefit from efficient network coverage in most countries.

However, the nomadic aspect of these things is often accompanied a need for energy autonomy. Now, even when based on the most energy-efficient mobile cellular radio technology, these connected things presently show consumption levels that rule out large-scale deployment at reasonable costs.

Faced with the problems of consumption by radio links for such nomadic applications, novel low-consumption radio technologies and low-bit-rate radio technologies, specifically dedicated to the "Internet of Things" networks, i.e. radio technologies for networks known as LPWAN (low-power wide-area networks), are now appearing. More particularly, these emerging technologies may be classified under two categories:

- on the one hand, there are proprietary technologies such as for example the technology of the company Sigfox®, or the LoRa® technique or again the technology of the firm Qowisio®. In practice, these non-standardized technologies all rely on the use of the "industrial, scientific and medical" (or ISM) frequency band and on the regulations associated with its use;
- on the other hand, there are several technologies promoted by standardizing organizations. For example, we can cite three technologies that are being standardized with the 3GPP (3$^{rd}$ Generation Partnership Project): NB-IoT (Narrow Band—Internet of Things), LTE MTC (Long Term Evolution—Machine Type Communication) and EC-GPRS (Extended Coverage General Packet Radio Service).

In this context, it appears that there is a risk that different technologies dedicated to data transmission for connected things might coexist, as is presently the case with cell-type communications.

Now, since the problems and issues related to the cost and autonomy of things are preponderant, there is a need to develop optimized solutions that make it possible to support different types of modulations, whether at transmission or at reception, in order to prevent approaches that superimpose different existing technologies and that lead to solutions that are costly and inefficient in terms of energy consumption.

Besides, certain operators such as Bouygues® or Orange® in France, have already taken to the LoRa® technology to deploy their networks dedicated to connected things.

There is therefore a need for a new technique enabling a multi-mode approach whether it is at transmission or at reception, especially adapted to the PPM modulation used by the LoRa® technology.

3 SUMMARY

In one embodiment of the invention, a method is proposed for generating a pulse-position-modulated signal. This modulated signal comprises a temporal succession of waveforms among Ns waveforms, an s-th waveform among the Ns waveforms being associated with a k rank symbol of a constellation of Ns symbols, k being an integer from 0 to Ns−1. The s-th waveform results from a circular permutation of the pattern of variation of a basic waveform over a duration Ts, obtained by a time shift of k times an elementary time duration Tc such that Ns*Tc=Ts. Such a method comprises the following steps executed for a k rank symbol of the constellation of Ns symbols:

obtaining a set of N modulation coefficients $c_l^{(k)}$, l being an integer varying in a set $S_n$ sized N, a modulation coefficient of index n among the N modulation coefficients, denoted as $c_n^{(k)}$, being expressed as the product of a reference modulation coefficient of index n, denoted as $c_n^{(r)}$, multiplied by a phase-shift term, the argument of which is proportional to n, the modulation coefficient referenced $c_n^{(r)}$ coming from the Fourier series decomposition of a reference waveform among the Ns waveforms associated with a symbol of rank r;

generating M temporal samples of a k-th waveform by forward or inverse Fourier transformation of the set of N modulation coefficients $c_l^{(k)}$.

Thus, the invention proposes a novel and inventive solution to enable the generation of a modulated signal following a pulse-position-modulation, i.e. a signal for which the information is carried by a circular permutation of the variation pattern of a basic waveform on a symbol duration following a time shift.

To this end, the claimed technique proposes to take account, in the frequency domain, of the inherent characteristics of this form of time-shift modulation. More particularly, since the waveform is a waveform with a bounded temporal support, a discrete set of coefficients can be obtained by its Fourier series decomposition. Besides, because of the temporal translation that exists between the waveforms associated with two distinct symbols, the Fourier coefficients associated with each of these symbols are connected to each other through a phase rotation term inducing a phase shift proportional to said translation.

It can be seen that the modulated signal can be generated through a Fourier transform of a vector, the terms of which are proportional to coefficients of the Fourier series decomposition of a reference waveform, i.e. a waveform associated with a reference symbol.

Thus, the generation of the modulated signal can be carried out by re-utilizing constituent blocks of modulated signal generators such as OFDM type multicarrier signals thereby optimizing the cost of a multi-mode type solution.

According to one embodiment, the step for obtaining the set of N modulation coefficients implements the following sub-steps for the modulation coefficient $c_n^{(k)}$ of said set:
  reading, in a first storage device, of the reference modulation coefficient $c_n^{(r)}$ coming from the Fourier series decomposition of the basic waveform;
  multiplication of the reference modulation coefficient $c_n^{(r)}$ by the phase-shift term, the argument of which is proportional to n, the multiplication delivering the modulation coefficient $C_n^{(k)}$.

Thus, only the reference modulation coefficients are preliminarily computed and memorized in a storage device (memory, table, register, recording medium, etc.) thereby optimizing the storage capacity of the device.

As a variant, instead of directly storing the reference modulation coefficients $c_n^{(r)}$, we store modified reference modulation coefficients, for example those already multiplied by a phase-shift term independent of k (for example multiplied by the phase-shift term $$e^{2j\pi n \frac{r}{N_s}},$$

which in this case amounts to storing the modulation coefficients $c_n^{(0)}$ of the basic waveform). Obtaining the term of the phase shift, the argument of which is proportional to n, is then simplified as are the computations needed for its multiplication with the modified reference modulation coefficient.

According to one embodiment, the step for obtaining the set of N modulation coefficients implements a step for the reading, in a second storage device, of the preliminarily computed modulation coefficients $c_l^{(k)}$.

Thus, the Ns sets of N modulation coefficients are preliminarily computed and memorized, making it possible to do away with an embedded multiplication step and thereby optimizing the consumption of the device implementing the claimed method.

According to one embodiment, the reference modulation coefficients $c_l^{(r)}$ are obtained by implementing the following steps:
  Fourier series decomposition of the reference waveform delivering a set of initial coefficients,
  selection of a set of N reference modulation coefficients among the initial coefficients, at least as a function of an energy-loss minimizing criterion.

Thus, only N coefficients among the countable but infinite set of Fourier coefficients are used in the technique described, therefore making it possible to minimize the embedded computations and thereby optimizing the consumption of the device implementing the method claimed.

Besides, the N coefficients are selected so as to minimize the energy loss in the signal thus generated relative to the expected waveform. Thus, the deformation of the waveform is multiplied for a given value of N.

According to different embodiments, the phase-shift term is proportional to:

$$e^{-2j\pi n \frac{k}{N_s}}$$

when the Fourier transformation is an inverse Fourier transformation, or $$e^{+2j\pi n \frac{k}{N_s}}$$

when the Fourier transformation is a forward Fourier transformation.

For example, if the reference modulation coefficients $c_n^{(r)}$ are stored, then the phase-shift term is expressed as $$e^{-2j\pi n \frac{(k-r)}{N_s}}$$

when the Fourier transformation is an inverse Fourier transformation or it is expressed as $$e^{2j\pi n \frac{(k-r)}{N_s}}$$

when the Fourier transformation is a forward Fourier transformation. As a variant, if the modified modulation coefficients are stored, for example those already multiplied by the phase-shift term $$e^{2j\pi n \frac{r}{N_s}}$$

(which in this case amounts to storing the modulation coefficients $c_n^{(0)}$ of the basic waveform), then the phase-shift term is expressed as $$e^{-2j\pi n \frac{k}{N_s}}$$

when the Fourier transformation is an inverse Fourier transformation or as $$e^{2j\pi n \frac{k}{N_s}}$$

when the Fourier transformation is a forward Fourier transformation.

Thus, only a fraction of N×Ns modulation coefficients are stored, the phase terms being possibly pre-computed or stored in a table and/or computed as and when they arise, for example by means of a CORDIC operator well known to those skilled in the art. Besides, the complexity can be further reduced by making use of the symmetries between trigonometric lines.

According to one embodiment, the set of N modulation coefficients $C_l^{(k)}$ forms a modulation vector and if the number M of temporal samples is greater than the number N of modulation coefficients $c_l^{(k)}$, then (M−N) null elements are added to the modulation vector.

Thus, the Fourier transform implemented in the form of a discrete Fourier transform (DFT) also carries out an oversampling function thereby avoiding the implementation of an additional module dedicated to this unique function.

According to one embodiment, the basic waveform has an instantaneous frequency that varies linearly between a first instantaneous frequency f0 and a second instantaneous frequency f1 for the duration Ts, the second instantaneous frequency f1 being chosen such that $f_1 = f_0$, and the reference modulation coefficient $c_n^{(r)}$ being given by $$c_n^{(r)} = 2(-1)^n(-j)^{\frac{N_S}{4}} e^{-2j\pi n \frac{r}{N_S}} \int_0^{\frac{1}{2}} e^{j\pi N_S v^2} \cos(2\pi n v) \, dv.$$

Thus, the technique described enables the implementation of a modulator adapted to the generation of a modulated chirp signal as used for example in the LoRa® technology dedicated to connected things, in re-utilizing constituent blocks of modulated signal generators such as OFDM type multicarrier signals. An existing OFDM signal generator can thus be used to implement chirp modulation at lower cost with the prospect of obtaining a multimedia transmitter.

Another advantage is that the amplitude of the coefficients decreases when n increases, i.e. the energy of the coefficients is concentrated on the coefficients of low index. The set of coefficients selected is small in size, thus reducing the costs of computation and storage.

In one embodiment of the invention, a method is proposed for demodulating a received signal resulting from a pulse-position modulation of a signal and the transmission of the modulated signal in a transmission channel. The modulated signal comprises a temporal succession of waveforms among Ns waveforms as described here above. Such a method comprises the following steps executed for M samples of the received signal representing a waveform included in the modulated signal:

forward or inverse Fourier transformation applied to the M samples of the received signal and delivering N transformed samples $Y_l$, l being an integer varying in a set $S_n$ sized N;

obtaining a set of N modulation coefficients $c_l^{(k)}$, l being an integer varying in the set $S_n$, a modulation coefficient of index n among the N modulation coefficients, denoted as $c_n^{(k)}$, being expressed as the product of a reference modulation coefficient of index n, denoted as $c_n^{(r)}$, multiplied by a phase-shift term, the argument of which is proportional to n, the reference modulation coefficient $c_n^{(r)}$ coming from the Fourier series decomposition of a reference waveform among the Ns waveforms associated with a symbol of rank r;

determining Ns decision components from the N transformed samples and the N modulation coefficients obtained, a decision component of index 1, denoted as a component $D_l$, being expressed as a function of a forward or inverse Fourier transform of N terms with l being an integer from 0 to Ns−1, a term of index n among the N terms, n an integer varying in the set $S_n$, being a function of a product of a transformed sample $Y_n$ multiplied by the obtained reference modulation coefficient $c_n^{(r)}$ or with the conjugate complex of the obtained reference modulation coefficient;

deciding on the rank $\hat{k}$ of the symbol carried by the waveform associated with the M samples, on the basis of the decision component having an extremum value among the Ns decision components, of index k, denoted as $D_k$.

Thus, the invention also relates to a method for demodulating a received signal corresponding to a modulated signal according to a pulse-position modulation, i.e. for which the information is carried by a time shift of the pattern of the basic waveform.

To this end, the claimed technique proposes to take account, in the frequency domain, of the characteristics inherent in this form of time-shift modulation. More particularly, if a phase-shift term related to such a time shift appears in the frequency domain, it is seen that the optimum receiver understood in terms of maximum likelihood can be expressed in this domain as the Fourier transform of a vector, the terms of which are a function of the coefficients of the Fourier series decomposition of a reference waveform associated with a symbol of rank r in the constellation of symbols and, at the same time, a function of the samples obtained at output of a first Fourier transform applied to the received signal.

If we consider Ns possible symbols and M samples of the received signal, it is convenient to choose, in practice, M=N, and N is a multiple of Ns, both chosen preferably as powers of two.

Thus, the processing operations according to the technique described remain proportional to $N_S \ln(N_S)$ operations whereas they are proportional to $N_S^2$ when the Ns correlations required by the optimal receiver as understood in terms of maximum likelihood are implemented according to known techniques.

According to one embodiment, the reference modulation coefficients $c_l^{(r)}$ are obtained by implementing the following steps:

Fourier series decomposition of the reference waveform, delivering a set of initial coefficients, selecting a set of N reference modulation coefficients among the initial coefficients, at least as a function of an energy-loss minimizing criterion.

Thus, only N coefficients among the countable but infinite set of Fourier coefficients are used in the technique described, therefore making it possible to minimize the embedded computations and thereby optimizing the consumption of the device implementing the method claimed.

Besides, the N coefficients are selected so as to minimize the energy loss of the signal thus generated relative to the expected waveform. Thus, the deformation of the waveform is minimal for a given value of N.

According to one embodiment, the Fourier transform applied to the M samples of the received signal is a forward transform. Such a method comprises a step for obtaining N parameters representing the transmission channel. The k-th component $D_k$ is expressed in a form proportional to the real part of $$\sum_{n \in S_\eta} Y_n H_n^* c_n^{(r)*} e^{2j\pi \frac{nk}{N_s}},$$

or its conjugate complex, with $H_n$, n an integer varying in the set $S_\eta$, being a parameter representing the transmission channel, obtained by applying a forward Fourier transform to the N time samples of the impulse response of the channel.

The choice of $S_\eta$ for the demodulation can be done with the method similar to the one employed during the generation of the signal, according to the energy minimizing criterion.

According to one embodiment, the Fourier transform applied to the M samples of said received signal is an inverse transform. Such a method comprises a step for obtaining N parameters representing the transmission channel. The k-th component $D_k$ is expressed in a form proportional to the real part of $$\sum_{n \in S_\eta} Y_n H_n^* c_{-n}^{(r)*} e^{-2j\pi \frac{nk}{N_s}},$$

or of its conjugate complex with $H_n$, n being an integer varying in the set $S_\eta$, a parameter representing the transmission channel, obtained by applying an inverse Fourier transform to Ns time samples of the impulse response of said channel.

Thus, in certain embodiments, the optimal receiver as understood in terms of maximum likelihood, can take account of the effects of the propagation channel while preserving the complexity in $N_S \ln(N_S)$.

According to one embodiment, the basic waveform has an instantaneous frequency varying linearly between a first instantaneous frequency f0 and a second instantaneous frequency f1 for the duration Ts, the second instantaneous frequency f1 being chosen such that $f_1 = -f_0$, and the reference modulation coefficient $c_n^{(r)}$ being given by $$c_n^{(r)} = 2(-1)^n (-j)^{\frac{N_s}{4}} e^{-2j\pi n \frac{r}{N_s}} \int_0^{\frac{1}{2}} e^{j\pi N_s v^2} \cos(2\pi n v) \, dv.$$

Thus, the described technique enables the implementation of an optimal demodulator, as understood in terms of maximum likelihood, of a modulated chirp signal especially, as used for example in the LoRa® technique dedicated to connected things, with computation complexity lower than that of the direct implementation of such a demodulator according to known techniques. The cost and consumption of such a solution is thus reduced.

Another advantage is that the amplitude of the coefficients decreases when n increases i.e. the energy of the coefficients is concentrated on the coefficients of low index. The set of selected coefficients is small-sized, thus reducing the costs of computation and storage.

The invention also relates to at least one computer program comprising program code instructions for the implementation of at least one method as described here above according to any one of its different embodiments when it is executed on a computer.

Another embodiment of the invention proposes a device for generating a pulse-position modulated signal. The modulated signal comprises a temporal succession of waveforms among Ns waveforms as described here above. The generating device comprises a reprogrammable computing machine or a dedicated computing machine capable of and being configured to:

obtain a set of N modulation coefficients $c_l^{(k)}$, l being an integer varying in a set $S_\eta$, a modulation coefficient of index n among the N modulation coefficients, denoted as $c_n^{(k)}$, being expressed as the product of a reference modulation coefficient of index n, denoted as $c_n^{(r)}$, multiplied by a phase-shift term the argument of which is proportional to n, the reference modulation coefficient $c_n^{(r)}$ coming from the Fourier series decomposition of a reference waveform among the Ns waveforms associated with a symbol of rank r;

generate M time samples of a k-th waveform by forward or inverse Fourier transformation of said set of N modulation coefficients $c_l^{(k)}$.

Such a generation device is especially capable of implementing the method for generating a pulse-position modulated signal according to the invention (according to any one of the different embodiments mentioned here above).

Thus, the characteristics and advantages of this device are the same as those of the method of generation described here above. It shall therefore not be described in more ample detail.

Another embodiment of the invention proposes a device for demodulating a received signal resulting from a pulse-position modulation of a signal and the transmission of the modulated signal in a transmission channel. The modulated signal comprises a temporal succession of waveforms among Ns waveforms as described here above. The demodulation device comprises a reprogrammable computing machine or a dedicated computing machine, capable of or being configured to:

apply a forward or inverse Fourier transformation to the M samples of the received signal and deliver N transformed samples $Y_l$, l being a integer varying in a set $S_\eta$ sized N;

obtain a set of N modulation coefficients $c_l^{(k)}$, l being an integer varying in the set $S_\eta$, a modulation coefficient of index n among the N modulation coefficients denoted as $c_n^{(k)}$, being expressed as the product of a reference modulation coefficient of index n, denoted as $c_n^{(r)}$, multiplied by a phase-shift term the argument of which is proportional to n, the reference modulation coefficient $c_n^{(r)}$ coming from the Fourier series decomposition of a reference waveform, among the Ns waveforms, associated with a symbol of rank r;

determine Ns decision components from the N transformed samples, a decision component of index l, denoted as the component $D_l$, being expressed as a function of a forward or inverse Fourier transform of N terms, with l being an integer from 0 to Ns−1, a term of index n among said N terms, n being an integer varying in the set $S_\eta$, being a function of a product of a transformed sample $Y_n$ multiplied by an obtained reference modulation coefficient $c_n^{(r)}$ or multiplied by the complex conjugate of said obtained reference modulation coefficient;

decide the rank $\hat{k}$ of the symbol carried by the waveform associated with the M samples, from the decision component presenting an extremum value among the Ns decision components, of index k, denoted as the component $D_k$.

Such a demodulation device is especially capable of implementing the method of demodulation of a received signal according to the invention (according to any one of the different embodiments mentioned here above).

Thus, the characteristics and advantages of this device are the same as those of the method of demodulation described here above. They are therefore not described in more ample detail.

4 LIST OF FIGURES

Other features and advantages of the invention shall appear from the following description, given by way of an indicatory and non-exhaustive example and from the appended drawings of which:

5 DETAILED DESCRIPTION OF THE INVENTION

In all the figures of the present document, the identical elements and steps are designated by a same reference.

The general principle of the technique described consists in obtaining N modulation coefficients representing a PPM modulated signal carrying a symbol of rank k in a constellation of Ns symbols, each modulation coefficient being expressed as the product of a reference modulation coefficient multiplied by a phase-shift term representing the rank k of the symbol considered. The modulation coefficients then make it possible to generate a modified PPM signal by application of a Fourier transform and to demodulate the same signal via a double Fourier transform implementing the optimal receiver as understood in terms of maximum likelihood.

Figure 1:
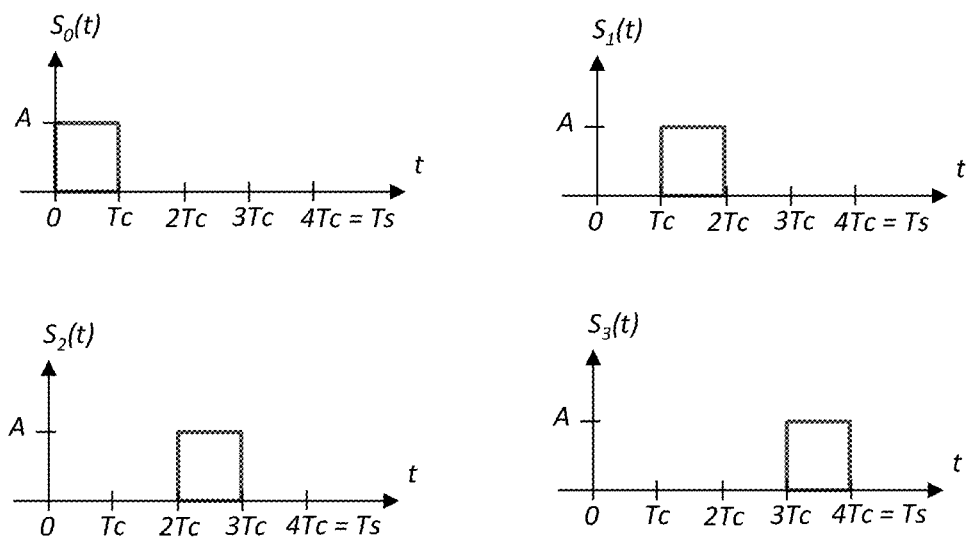
FIG. 1 illustrates the general characteristics of a PPM type modulation.

Referring to FIG. 1, we shall describe the general characteristics of a PPM type modulation considered in the present application.

In general, the waveform $s_k(t)$ of a PPM modulated signal carrying a symbol of rank k in a constellation of Ns symbols for a duration Ts can be expressed as $$s_k(t)=p(t-kT_c[T_S])=\tilde{p}(t-kTc) \qquad \text{(Eq-1)}$$

where [.] designates the modulo function and where $p(t)=s_0(t)$ is a basic waveform, the variation pattern of which is shifted by a circular permutation over a duration Ts via a time shift of k times an elementary time duration Tc such that Ns*Tc=Ts, to obtain the waveform $s_k(t)$ carrying the symbol of rank k in the constellation. In this expression, $\tilde{p}(t-kTc)$ is the Ts-periodic function derived from p(t), i.e. such that $p(t+nT_S)=p(t)$ for $t \in [0, T_s]$ and $\forall n \in \mathbb{Z}$.

Thus, in the case of a constellation of four symbols (i.e. Ns=4), the waveforms $s_0(t)$, $s_1(t)$, $s_2(t)$ and $s_3(t)$, respectively representing the symbols of rank 0, 1, 2 and 3 in the constellation, result from a circular permutation of the variation pattern of a basic waveform over a duration Ts, obtained by a time shift equal respectively to 0, 1, 2 and 3 times the elementary time duration Tc.

In the case illustrated in FIG. 1, the basic waveform is a time gate with support $[0, T_c]$ and amplitude A. Thus, the waveforms $s_0(t)$, $s_1(t)$, $s_2(t)$ and $s_3(t)$, respectively representing the symbols of rank 0, 1, 2 and 3 in the constellation of four symbols, are obtained by a simple time shift of the basic waveform equal respectively to 0, 1, 2 and 3 times the elementary time duration Tc.

Figure 2A:
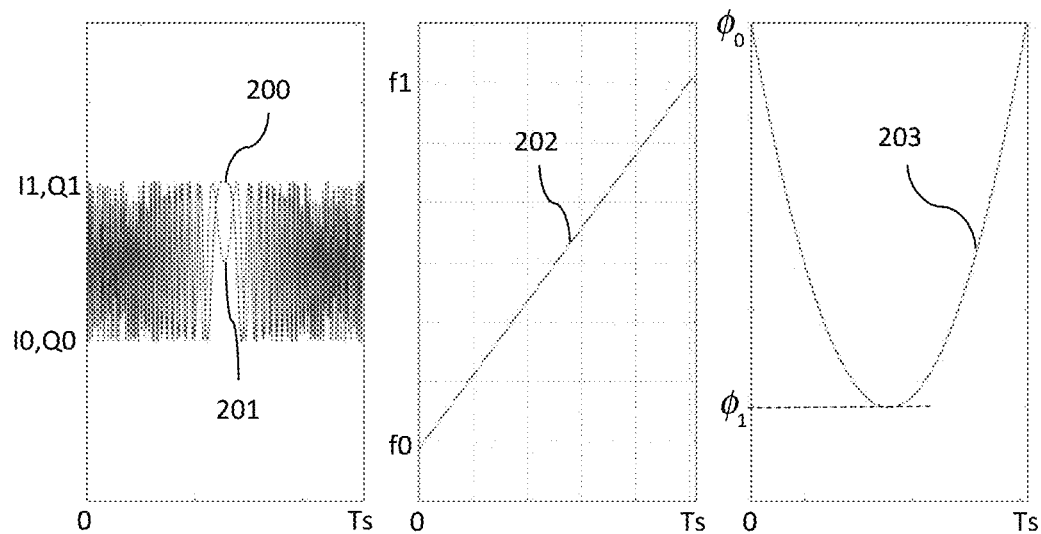
FIGS. 2a and 2b illustrate the characteristics of a non-modulated chirp signal as well as the instantaneous frequencies and the instantaneous phases of different modulated chirp signals used in the LoRa® technology.
Figure 2B:
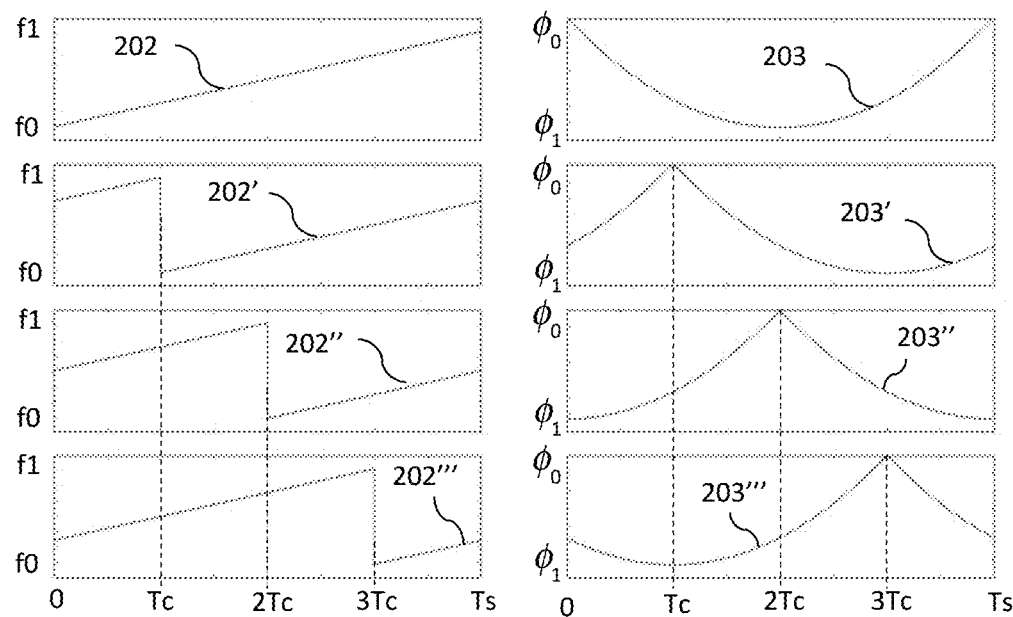

Referring to FIGS. 2a and 2b, a description is now provided of the characteristics of a non-modulated chirp signal as well as the instantaneous frequencies and the instantaneous phases of the different modulated chirps signals used in the LoRa® technology.

For example, the patent document EP 2 449 690 B1 describes a technique on which the LoRa® technology is based. The transmission of the information is based on the modulation of a basic chirp signal. As shown in FIG. 2a, the instantaneous frequency 202 of the basic chirp signal varies linearly between a first instantaneous frequency f0 and a second instantaneous frequency f1 for the duration Ts of a symbol. Such an instantaneous frequency herein represents the rotation speed in the complex plane of the vector, the coordinates of which are given by the in-phase signal 200 and the in-quadrature signal 201 representing the modulating signal that is to modulate the radio carrier so as to generate the RF basic chirp signal.

Since the chirp signal is a signal with a constant envelope, the in-phase signal 200 and the in-quadrature signal 201 respectively oscillate between two extremal values, respectively I0 and I1 and Q0 and Q1. Only the frequency of these signals varies linearly in time as the instantaneous frequency 202 of the resulting basic chirp signal. Owing to the linear variation of the instantaneous frequency 202, the basic chirp signal thus defined has an instantaneous phase 203 which varies quadratically between two values $\varphi_0$, and $\varphi_1$ for the duration Ts, the instantaneous frequency being the derivative of the instantaneous phase.

The modulated chirp signals are then obtained by circular permutation of the pattern of variation of the instantaneous frequency of the basic chirp signal over a duration Ts, obtained after a time shift of k times an elementary time duration, called a "chip" duration Tc. The index k then represents the rank of a symbol in a constellation of Ns symbols and we then have Ns*Tc=Ts. By way of an illustration, FIG. 2b represents the instantaneous frequency 202, 202', 202'', 202''' and the instantaneous phase 203, 203', 203'', 203''' of different modulated chirp signals corresponding respectively to k=0, k=1, k=2 and k=3, i.e. enabling the transmission of the information on the basis of a constellation of four symbols. The basic chirp signal, corresponding to k=0, is then interpreted in this case as carrying the symbol of rank zero in the constellation.

The inventors have noted that, according to this technology, determining the value of a symbol received via such a signal, i.e. determining its rank k in the constellation of N symbols, is equivalent to determining the index k that has served as a basis for computing the time shift used to generate the instantaneous phase and instantaneous frequency pattern of the modulated chirp signal in question.

It can be seen, besides, that the basic chirp signal can be expressed in the time domain and over the duration of a symbol period, i.e. fort from 0 to Ts as $$p(t) = s_0(t) = e^{j\phi(t)} \text{ where } \phi(t) = 2\pi\left(f_0 + \frac{f_1 - f_0}{2T_s}t\right)t + \phi_0$$

with $\varphi_0$ being the initial value of the phase.

In practice, the LoRa® signal is such that the bandwidth of the chirp signal, i.e. $|f_1-f_0|$, is adjusted inversely to the chip duration Tc and the second instantaneous frequency f1 is chosen such that $f_1=f_0$. It being known that Ts=Ns*Tc, the expression of the instantaneous phase of the chirp signal can then be rewritten as $$\phi(t) = \frac{2\pi}{T_c}\sigma\left(\frac{t}{2N_sT_c} - \frac{1}{2}\right)t + \phi_0$$

with σ being a parameter belonging to {−1,1} making it possible to model both the rising chirp signals (i.e. with a rising instantaneous frequency) and the descending chirp signals (i.e. those with a decreasing instantaneous frequency).

The analytical expression, $s_k(t)$, of a chirp signal modulated by a symbol of rank k in the constellation of Ns symbols (k therefore ranging from 0 to Ns−1) and therefore corresponding to a circular permutation of the pattern of the basic chirp signal as described here above, can be then expressed as $$s_k(t)=s_0(t-kT_c[T_S])=e^{j\varphi(t-kT_c[T_S])} \quad \text{(Eq-2)}$$

When comparing this equation with (Eq-1), it can be seen that the modulated chirp signals, such as are used in the LoRa® technology, correspond to a PPM modulation of a basic chirp signal $s_0(t)$.

Figure 3A:
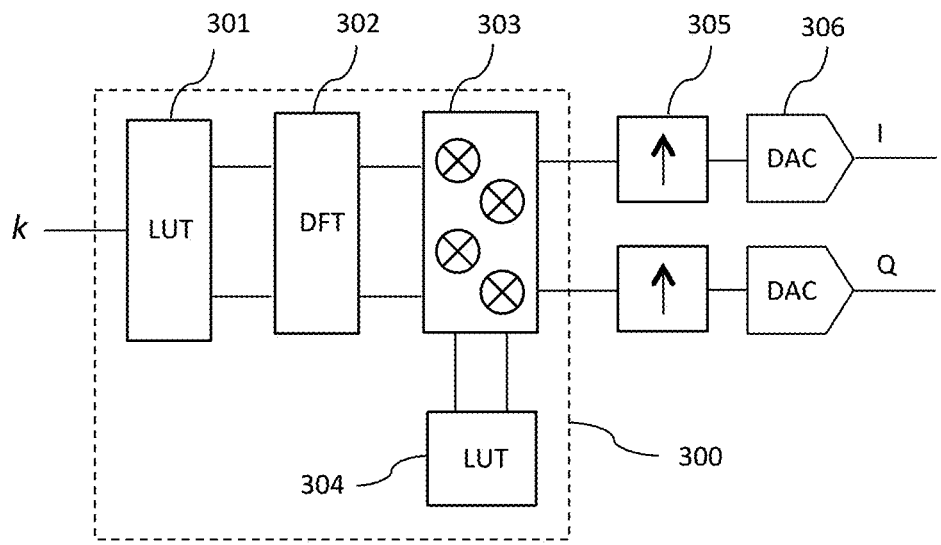
FIGS. 3a and 3b illustrate structures for generating PPM modulated signals according to different embodiments of the invention.
Figure 3B:
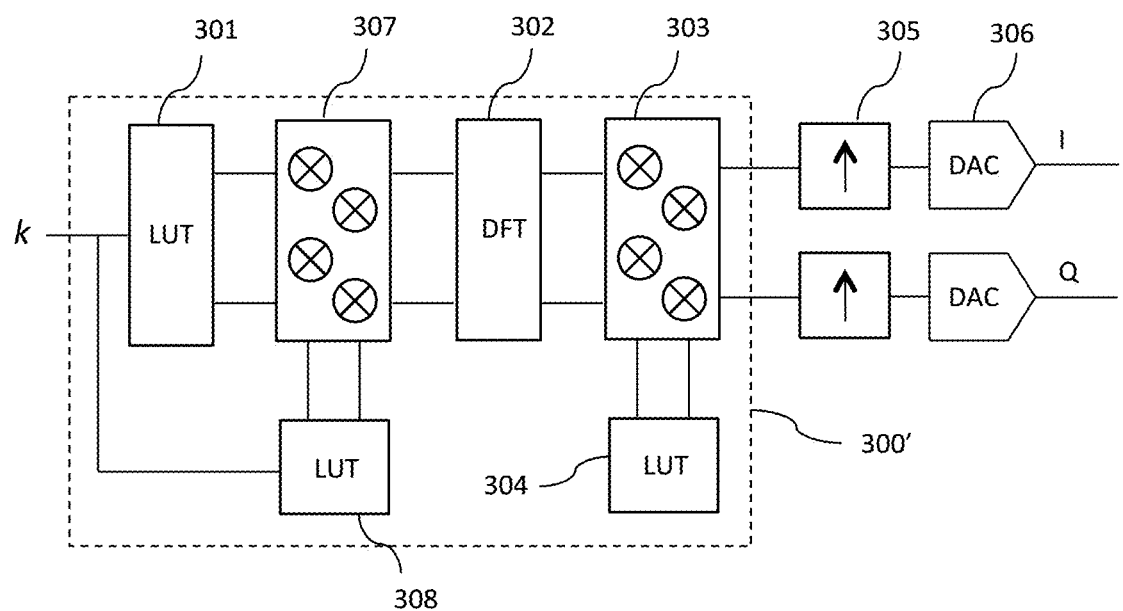

Referring now to FIGS. 3a and 3b, we describe the structures for generating PPM modulated signals according to different embodiments of the invention.

More particularly, a device 300, 300' for generating PPM modulated signals receives the symbol of rank k in a constellation of Ns symbols, this rank k having been preliminarily obtained by placing data bits in correspondence with the constellation of Ns symbols.

In a first embodiment (illustrated in FIG. 3a), a device 301 for storing modulation coefficients then delivers a set of N modulation coefficients corresponding to the symbol of rank k. In variants, the device 301 for storing modulation coefficients consists of a memory, registers, a recording medium support or any other equivalent. The N modulation coefficients then serve as input vectors to a discrete Fourier transform module 302.

In a second embodiment (illustrated in FIG. 3b), the input vector of the discrete Fourier transform module 302, corresponds to the N modulation coefficients delivered by the modulation coefficients storage device 301, each multiplied by a phase-shift term delivered by the generator 308 of phase-shift terms. The multiplication of each modulation coefficient by a phase-shift term is then performed for a first complex multiplier 307.

The discrete Fourier transform module 302 then delivers M time samples of the waveform associated with the symbol of rank k on the symbol duration Ts to a second complex multiplier 303. In one variant, M=N and the number of samples delivered by the discrete Fourier transform module 302 is identical to the number of modulation coefficients that serve this module as input vectors. Thus, the complexity of the discrete Fourier transform module is minimal. In another variant, M>N, and the discrete Fourier transform module 302 also carries out an over-sampling function, thereby minimizing the functions that have to be implemented in the device.

In one embodiment, the discrete Fourier transform module 302 implements the discrete Fourier transform. In another embodiment, the discrete Fourier transform module 302 carries out an inverse Fourier transform.

According to one particular embodiment, the second complex multiplier 302 then carries out a complex multiplication of each of the M time samples, delivered by the discrete Fourier transform module 302, by a de-rotation term delivered by the de-rotation terms generator 304, this de-rotation enabling the implementing of the forward Fourier transform of the discrete Fourier transform module 302 according to a classic structure as explained in detail here below with reference to FIG. 4.

The device 300, 300' for generating PPM modulated signals according to the technique described then delivers the M time signals given by the second complex multiplier 303 to an over-sampling module 305 (for example a linear filter of the CIC (cascaded integrator-comb) type or any other equivalent) before conversion into an analog signal by a digital-analog converter (DAC) 306 (for example a flash converter or a converter based on a sigma-delta modulator, or a device of the SAR (successive approximation register) type or any other equivalent), thereby making it possible to relax the constraints on this latter stage. Thus, in-phase l and in-quadrature Q components of the analog waveform carrying the symbol of rank k are generated. These I and Q components are then used to modulate a radiofrequency, or RF, carrier through the use of an RF transmitter known to those skilled in the art (for example a direct-conversion transmitter, a superheterodyne transmitter or one of any equivalent architecture), implementing an in-quadrature modulator and delivering an RF modulated signal, a complex envelope of which is the image of the waveform delivered by the generating device 300, 300'.

Figure 4:
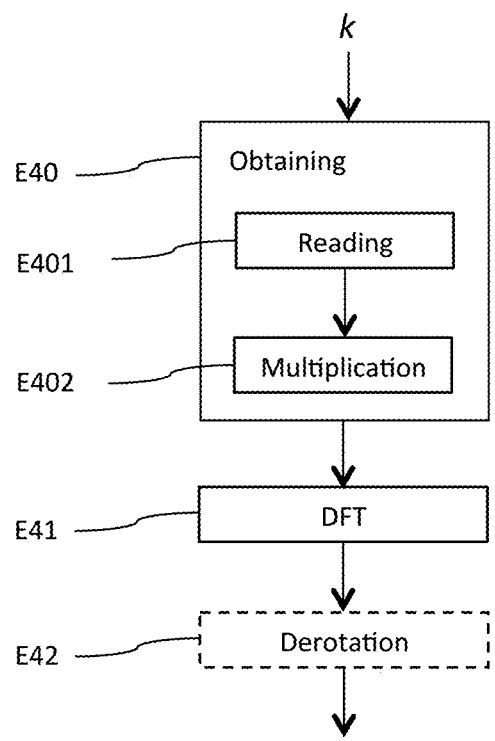
FIG. 4 illustrates the main steps of a method for generating a PPM modulated signal according to different embodiments of the invention.
Figure 5:
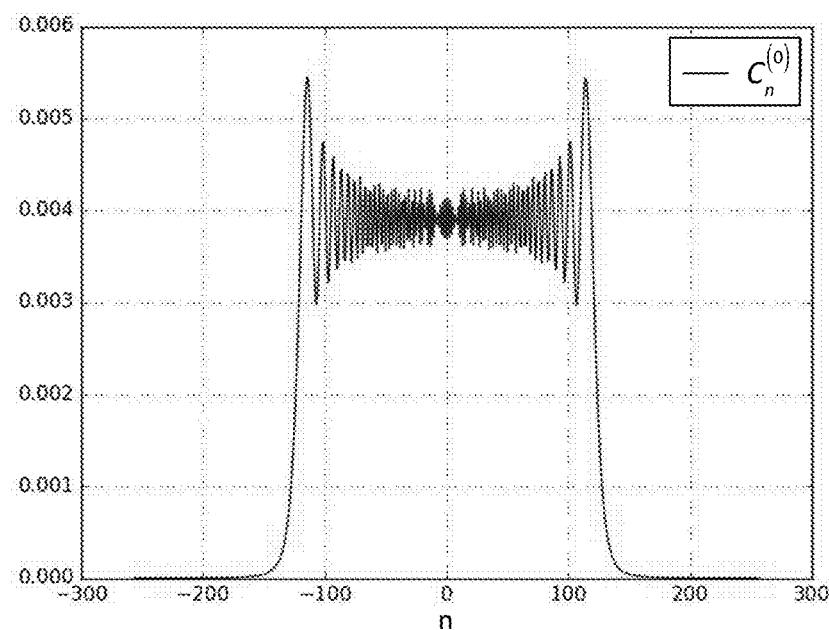
FIG. 5 illustrates the value of the modulation coefficients in the case of a LoRa® modulation according to one embodiment of the invention.

Referring now to FIGS. 4 and 5, we describe the steps of a method for generating a PPM modulated signal according to different embodiments of the invention.

During an obtaining step E40, N modulation coefficients $c_l^{(k)}$, l being an integer varying in the set $S_n$, that are associated with the waveform carrying the symbol of rank k in the constellation of symbols are obtained.

Indeed, if we reconsider the characteristics related to the waveforms of a PPM modulated signal described here above with reference to FIG. 1, it can be seen that these waveforms have a finite temporal support [0, $T_s$]. It can then be envisaged to express them on the basis of a Fourier series decomposition of their periodized function.

To this end, it can be noted that the Ts-periodic function $\tilde{p}(t-kT_c)$ defined here above with reference to the equation (Eq-1) can be broken down as $$\tilde{p}(t) = \sum_{n=-\infty}^{+\infty} c_n e^{2j\pi n \frac{t}{T_s}} \text{ with } c_n = \frac{1}{T_s}\int_{-\frac{T_s}{2}}^{\frac{T_s}{2}} \tilde{p}(t) e^{-2j\pi n \frac{t}{T_s}} dt.$$

As a result, the waveform $s_k(t)$ of the PPM modulated signal carrying the symbol of rank k in the constellation of Ns symbols can be expressed as follows $$s_k(t) = \sum_{n=-\infty}^{+\infty} c_n e^{-2j\pi \frac{nk}{N_s}} e^{2j\pi n \frac{t}{T_s}} = \sum_{n=-\infty}^{+\infty} c_n^{(k)} e^{2j\pi n \frac{t}{T_s}} \quad \text{(Eq-3)}$$

with $c_n^{(k)} = c_n e^{-2j\pi n \frac{k}{N_s}}$

It can be seen in particular that $c_n^{(0)} = c_n$ and therefore that $$c_n^{(k)} = c_n^{(0)} e^{-2j\pi n \frac{k}{N_s}} \quad \text{(Eq-4)}$$

In general, the modulation coefficients $c_i^{(k)}$ associated with the waveform carrying the symbol of rank k in the constellation of Ns symbols can be expressed as a function of the modulation coefficients $c_i^{(r)}$ associated with the waveform carrying a reference symbol of rank r in this same constellation. Indeed, the equation (Eq-4) gives us the following for a modulation coefficient of index n $$c_n^{(k)} = c_n^{(r)} e^{-2j\pi n \frac{(k-r)}{N_s}} \quad \text{(Eq-5)}$$

In one embodiment, the basic waveform has an instantaneous frequency varying linearly between a first instantaneous frequency f0 and a second instantaneous frequency f1 for the duration Ts, as for example a basic chirp signal used in the LoRa® technology and described here above with reference to FIGS. 2a and 2b. in this case, the expression of the waveform $s_k(t)$ given by the equation (Eq-2) can be put in the following form $$s_k(t) = e^{2j\pi\sigma\frac{N_s}{2}\bar{\phi}\left(\frac{1}{N_s}\left(\frac{t}{T_c}-k\right)\right)} \triangleq g\left(\frac{1}{N_s}\left(\frac{t}{T_c}-k\right)\right)$$

with $\bar{\phi}$ being a function defined by $\bar{\phi}(u)=(u-1)u$ for $u \in [0,1]$ and periodized on $\mathbb{R}$ with a period of 1.

This means that the modulation coefficients $c_n^{(0)} = c_n$, defined by $$c_n = \int_{-\frac{1}{2}}^{\frac{1}{2}} g(u) e^{-2j\pi nu} du,$$

can be expressed in this embodiment as $$c_n = \int_{-\frac{1}{2}}^{\frac{1}{2}} e^{j\pi N_s \sigma \bar{\phi}(u)} e^{-2j\pi nu} du = \quad \text{(Eq-6)}$$

$$\int_{-\frac{1}{2}}^{0} e^{j\pi N_s \sigma(u+1)u} e^{-2j\pi nu} du + \int_{0}^{\frac{1}{2}} e^{j\pi N_s \sigma(u-1)u} e^{-2j\pi nu} du =$$

$$\int_{0}^{\frac{1}{2}} e^{j\pi N_s \sigma(u-1)u} e^{2j\pi nu} du + \int_{0}^{\frac{1}{2}} e^{j\pi N_s \sigma(u-1)u} e^{-2j\pi nu} du =$$

$$2\int_{0}^{\frac{1}{2}} e^{j\pi N_s \sigma\left(\left(u-\frac{1}{2}\right)^2 - \frac{1}{4}\right)} \cos(2\pi nu) du =$$

$$2 e^{-j\pi\sigma\frac{N_s}{4}} \int_{-\frac{1}{2}}^{0} e^{j\pi N_s \sigma v^2} \cos\left(2\pi n\left(v+\frac{1}{2}\right)\right) dv$$

giving $$c_n = 2(-1)^n(-\sigma j)^{\frac{N_s}{4}} \int_{0}^{\frac{1}{2}} e^{j\pi\sigma N_s v^2} \cos(2\pi nv) dv$$

The amplitude of the modulation coefficients $c_n^{(0)} = c_n$ given by this equation and corresponding to the LoRa® waveform is represented in FIG. 5 as a function of the index n. It can be seen then that this amplitude decreases when n increases, i.e. that the energy of the modulation coefficients $c_n^{(0)} = c_n$ is concentrated on the coefficients of a low index n (for example N smaller than 150).

This is in fact a general result on the Fourier coefficients that herein remains valid for the modulation coefficients $c_i^{(k)}$ associated with the waveform carrying the symbol of rank k. Indeed, only a phase-shift term having a constant amplitude differentiates the modulation coefficients associated with the waveform carrying a symbol of a given rank from the modulation coefficients associated with the waveform carrying a symbol of another rank if the equations (Eq-4) and (Eq-5) are referred to. The result of this is that the number N remains valid whatever the rank of the symbol considered.

Thus, in one embodiment, a finite set $S_\eta$ of N modulation coefficients $c_i^{(k)}$ is selected from among the countable but infinite set of Fourier coefficients associated with the waveform carrying the symbol of rank k. In one variant, the N modulation coefficients are selected so as to minimize the energy loss on the waveform obtained by truncation of the Fourier series. More particularly, the N modulation coefficients are selected by comparing the sum of their modulus squared with n times (for example, 0.95 times) the sum of the modulus squared of all the Fourier coefficients. Thus, 100*n percent of the energy of the symbols is reconstituted. More particularly, the finite set $S_\eta$ of N modulation coefficients is chosen so that:

$$\sum_{n \in s_\eta} |c_n^{(k)}|^2 \geq \eta \sum_{n \in \mathbb{Z}} |c_n^{(k)}|^2$$

Because the moduli of the modulation coefficients do not vary with k, this inequality remains verified for a different rank and therefore the set $S_\eta$ is valid for all the symbols.

The N modulation coefficients associated with the waveform carrying the symbol of rank k thus selected are then stored in the device 301 for storing modulation coefficients. In one variant, these steps for computing and selecting N modulation coefficients are implemented during the phases prior to the use of the generating device 300, 300', the storage properly speaking in the device 301 for storing modulation coefficients being done for example during the manufacture of the generating device 300, 300', or during a phase for initializing the device (for example when powering on) or again through an updating in real time during the operation of the generating device 300, 300' (e.g. during an updating known as an OTA or "over-the-air" updating).

Thus, in the embodiment described here above with reference to FIG. 3a, the N modulation coefficients $c_l^{(k)}$ obtained during the obtaining step E40 are directly delivered by the device 301 for storing modulation coefficients to the discrete Fourier transform module 302 during the implementation of a reading sub-step E401.

More particularly, since the constellation considered comprises Ns symbols, in this embodiment the device 301 for storing modulation coefficients stores Ns*N modulation coefficients thereby doing away with the need for the different embedded computations and thus optimizing the consumption of the device implementing the described technique.

In another embodiment described here above with reference to FIG. 3b, the device 301 for storing modulation coefficients stores only the N reference modulation coefficients $c_l^{(r)}$ associated with the waveform carrying the reference symbol of rank r. Indeed, the equation (Eq-5) shows us that the modulation coefficient of index n associated with the waveform carrying the symbol of rank k is obtained by multiplying the modulation coefficient referenced $c_n^{(r)}$ by the phase-shift term $$e^{-2j\pi n \frac{(k-r)}{N_s}}.$$

Thus, during a multiplication sub-step E402, the reference modulation coefficient $c_n^{(r)}$ of index n (delivered by the device 301 for storing a modulation coefficients during the reading sub-step E401) is multiplied, through the first complex multiplier 307, by the phase-shift term $$e^{-2j\pi n \frac{(k-r)}{N_s}}$$

delivered by the generator 308 of phase-shift terms.

In one variant, the device 301 for storing modulation coefficients stores a modified reference modulation coefficient, i.e. the reference modulation coefficient $c_n^{(r)}$ already multiplied by a phase-shift term independent of k. It can be for example the term $$e^{2j\pi n \frac{r}{N_s}},$$

with $c_n^{(r)}$ leads again to the storage of the term $c_n^{(0)}$ in the device 301 for storing modulation coefficients. The phase-shift term delivered by the generator 308 of phase-shift terms is then again reduced to $$e^{-2j\pi n \frac{k}{N_s}},$$

thereby simplifying the different computations as and when the method described is executed.

In one variant, the phase-shift terms are preliminarily computed and stored in the generator 308 of phase-shift terms which in this case takes the form of a memory, registers, a recording carrier or any other equivalent. In another variant, the phase-shift terms are computed as and when they arise, for example by means of a CORDIC type operator well known to those skilled in the art.

In a step E41, a Fourier transform implemented by the discrete Fourier transform module 302 is applied to the N modulation coefficients $c_l^{(k)}$ associated with the waveform carrying the symbol of rank k and obtained during the implementation of the step E40.

Indeed, on the basis of the equation (Eq-3) and taking account of the selection performed on the modulation coefficients among the infinity possible, the k-th waveform carrying the symbol of rank k can be approximated by the waveform $\tilde{s}_k(t)$ expressed by $$\tilde{s}_k(t) = \sum_{n \in S_\eta} c_n^{(k)} e^{2j\pi n \frac{t}{T_s}}$$

More particularly. if we consider a sampled version of this time signal sampled at the rate $$\frac{1}{T} = M \times \frac{1}{T_s},$$

with M≥N, we can write the following $$\tilde{s}_k(mT) = \sum_{n \in S_\eta} c_n^{(k)} e^{2j\pi \frac{nm}{M}}$$

with m ranging from 0 to M−1.

It can thus be seen that the M time samples (equally distributed over the duration [0, $T_s$]) of the waveform $\tilde{s}_k(t)$ approximating the waveform $s_k(t)$ carrying the symbol of rank k, are expressed as the result of an inverse discrete Fourier transform of the N corresponding modulation coefficients.

More particularly, if we consider that the finite set $S_n$ of the N modulation coefficients chosen among the possible infinity of coefficients has the form $S_n=[-L,L-1]$ with $N=2L$, it can be written that $$\tilde{s}_k(mT) = e^{-2j\pi \frac{mL}{M}} \sum_{n=0}^{2L-1} c_{n-L}^{(k)} e^{2j\pi \frac{nm}{M}} \quad \text{(Eq-7)}$$

It can thus be seen that M time samples of the waveform $\tilde{s}_k(t)$ approximating the waveform $s_k(t)$ are expressed as an inverse Fourier transform, implemented according to a classic structure (i.e. corresponding to a sum from 0 to N−1), of the $N=2L$ modulation coefficients $c_l^{(k)}$ that are associated with the waveform carrying the symbol of rank k and obtained during the implementation of the step E40.

According to one particular embodiment, the M transformed samples delivered by the discrete Fourier transform module 302 implementing such an inverse discrete Fourier transform are then given to the second complex multiplier 303 for implementing a de-rotation at the step E42.

More particularly, the de-rotation corresponds to the term-by-term multiplication, by the second complex multiplier 303, of the M samples delivered by the discrete Fourier transform module 302 with the de-rotation term $$e^{-2j\pi \frac{mL}{M}}$$

delivered by the generator 304 of de-rotation terms with the aim of providing the M samples $\tilde{s}_k(mT)$ according to the equation (Eq-7) here above.

In one variant, the de-rotation terms are preliminarily computed and stored in the generator 304 of de-rotation terms which, in this case, takes the form of a memory, registers, a recording medium or any other equivalent. In another variant, the de-rotation terms are computed as and when they arise, for example by means of a CORDIC type operator well known to those skilled in the art.

Besides, if we reconsider the equation (Eq-7) here above, it can be seen that a change of variable from n towards 2L−1n leads to the expression $$\tilde{s}_k(mT) = e^{2j\pi \frac{m(L-1)}{M}} \sum_{n=0}^{2L-1} c_{L-1-n}^{(k)} e^{-2j\pi \frac{nm}{M}} \quad \text{(Eq-8)}$$

Thus, in another embodiment, the Fourier transform implemented in the discrete Fourier transform module 302 is a forward Fourier transform and the N modulation coefficients associated with the waveform carrying the symbol of rank k obtained during the implementation of the step E40 are those with an index opposite those used when the Fourier transform implemented in the Fourier transform module 302 is an inverse Fourier transform. More particularly, in the embodiment corresponding to the implementation of the equation (Eq-8), the forward discrete Fourier transform is applied to the modulation coefficients $c_{-l}^{(k)}$ with l ranging from −L+1 to L, the modulation coefficients $c_l^{(k)}$ being obtained according to the technique described here above, according to any one of its different embodiments.

Besides, in this embodiment, the de-rotation terms delivered by the generator 304 of de-rotation terms correspond to the M terms $$e^{2j\pi \frac{m(L-1)}{M}},$$

m ranging from 0 to M−1.

In one variant, M is greater than N and the Fourier transform also carries out an over-sampling function thereby avoiding the implementation of an additional module, for example the over-sampling module 305 dedicated to this unique function. In this case (M−N) null elements are added to the modulation vector constituted by the N modulation coefficients given to the discrete Fourier transform module 302 so as to obtain the M time samples of the waveform $s_k(t)$ approximating the waveform $s_k(t)$ through a discrete Fourier transform on M elements.

In another variant, M is expressed as a power of two. Thus, the Fourier transform can be implemented according to a fast Fourier transform, or FFT, according to a particularly efficient algorithm.

Figure 6A:
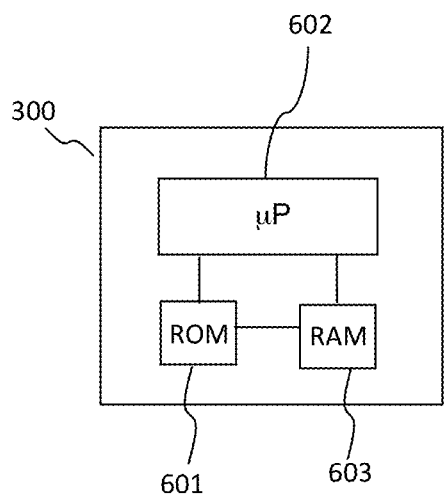
FIGS. 6a and 6B illustrate examples of structures of devices for generating PPM modulated signals according to different embodiments of the invention.
Figure 6B:
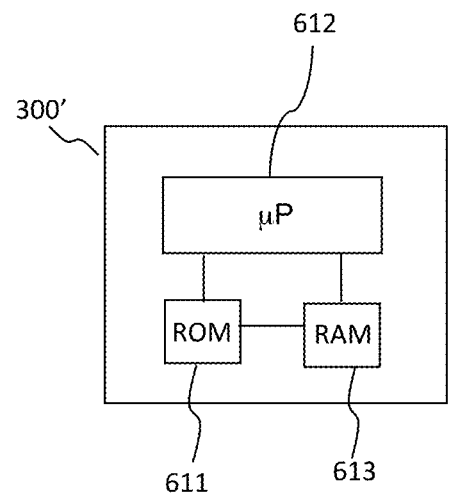

FIGS. 6a and 6b present examples of structures of a device for generating PPM modulated signals enabling the implementing of a method for generating described with reference to FIG. 4 according to different embodiments of the invention.

The device 300, 300' for generating PPM modulated signals comprises a random-access memory 603, 613 (for example a RAM), a processing unit 602, 612, equipped for example with a processor and managed by a computer program stored in a read-only memory 601, 611 (for example a ROM or a hard disk drive). At initialization, the code instructions of the computer program are for example loaded into the random-access memory 603, 613 and then executed by the processor of the processing unit 602, 612.

These FIGS. 6a and 6b illustrate only one particular way, among several possible ways, of making the device 300, 300' for generating PPM modulated signals so that it carries out certain steps of the method described in detail here above with reference to FIG. 4 (in any one of its different embodiments). Indeed, these steps can be carried out equally well on a re-programmable computing machine (a PC, a DSP or a microcontroller) executing a program comprising a sequence of instructions or on a dedicated computing machine (for example a set of logic gates such as an FPGA or an ASIC or any other hardware module).

Should the device 300, 300' for generating modulated signals be made with a programmable computing machine, the corresponding program (i.e. the sequence of instructions) could be stored in a detachable storage medium (such as for example a floppy disk, a CD-ROM or a DVD-ROM) or non-detachable storage medium, this storage medium being partially or totally readable by a computer or a processor.

Figure 7:
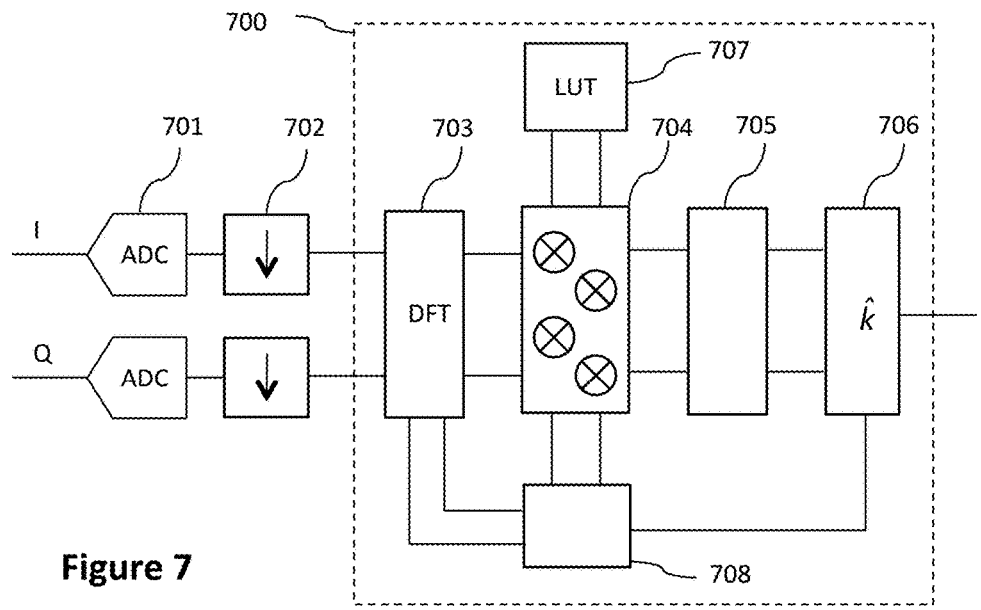
FIG. 7 illustrates a structure for demodulating PPM modulated signals according to different embodiments of the invention.

Referring now to FIG. 7, a description is provided of a structure for demodulating received PPM modulated signals according to different embodiments of the invention.

More particularly, this figure illustrates the modules used to carry out processing operations on in-phase signals I and in-quadrature signals Q, representing the modulating signal obtained after radiofrequency or RF demodulation of the radiofrequency signal received (here below in this patent application, the term 'RF demodulation' designates the transposition into baseband of the received signal, this transposition delivering analog I and Q signals representing the signal modulating the received RF carrier and the term 'demodulation' designates the processing operations carried out on the I and Q signals, often after sampling and quantification, leading to the determining of the information contained in the modulating signal).

In practice, such I and Q signals are obtained via the use of an RF receiver known to those skilled in the art (for example a direct conversion receiver, a superheterodyne receiver or any equivalent architecture), implementing an in-quadrature RF demodulator and delivering two analog channels I and Q.

The signals I and Q are then sampled by an analog-digital converter or ADC 701 (for example a flash converter or a converter based on a sigma-delta modulator or of the SAR (successive approximation register) type or any other equivalent) present on the corresponding reception channel. In one classic reception sequence, with such a converter working at a sampling frequency that is often high relative to the bandwidth of the payload signal, the signal delivered by the ADC is decimated by a decimation stage 702 (for example a CIC (cascaded integrator-comb) type of linear phase filter) present on each of the I and Q paths so that each one delivers M samples at the rate of $M/T_s$. These M samples can be interpreted as the real and imaginary parts of M complex samples representing a PPM-modulated signal carrying a symbol belonging to a constellation of Ns symbols.

The M complex samples are then delivered to a demodulation device 700 comprising different modules.

More particularly, the M complex samples are directly delivered to a discrete Fourier transform module 703 that delivers N transformed samples to a complex multiplier 704.

The complex multiplier 704 then carries out a term-by-term multiplication of N samples delivered by the discrete Fourier transform module 703 with N modulation coefficients delivered by the device 707 for storing modulation coefficients as well as with N channel coefficients delivered by the channel estimator 708. In variants, the device 707 for storing modulation coefficients consists of a memory, registers, a recording medium, and any other equivalent. The channel estimator 708 for its part estimates the channel coefficients on the basis of samples provided by the discrete Fourier transform module 703 and the rank of a corresponding received symbol, this symbol possibly corresponding to a predetermined symbol (e.g. a symbol of a learning sequence) or a symbol (e.g. a data symbol) decided preliminarily by the decision module 305.

The complex multiplier 704 then delivers the N multiplied samples to a generation module 705 which then generates Ns decision components representing the rank k, in the constellation of Ns symbols, of the symbol carried by the PPM modulated received signal.

The Ns components are then delivered to a decision module 706 which decides the rank k of the received symbol as a function of the index of the decision component that has an extremum value among the Ns components.

Figure 8:
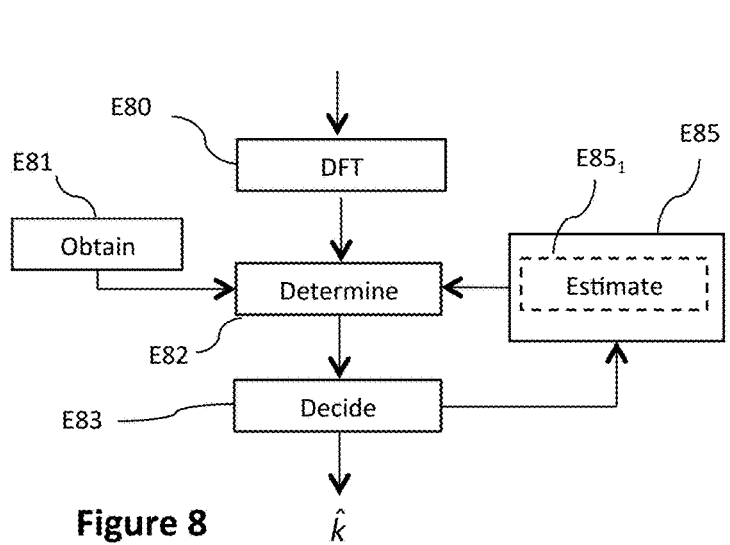
FIG. 8 illustrates the main steps of a method for demodulating a PPM modulated signal according to different embodiments of the invention.

Referring now to FIG. 8, we describe the steps of a method for demodulating a received signal according to different embodiments of the invention. At a step E80, a forward discrete Fourier transform is applied by the discrete Fourier transform module 703 to the M complex samples taken over a duration Ts and representing a received symbol (these are M samples, the real and imaginary parts of which are delivered by the decimation stages 702 present on the reception channels I and Q).

Indeed, assuming that the waveform $s_k(t)$ carrying the symbol of rank k in the constellation of Ns symbols has been transmitted through a propagation channel, the equivalent baseband impulse response of which is h(t), the received signal transposed into baseband as obtained at input to the discrete Fourier transform module 703 is expressed as:

$$y(t) = (h * s_k)(t) + w(t) = \int_0^{+\infty} h(\tau) s_k(t-\tau) d\tau + w(t)$$

with w(t) being a centered, additive white Gaussian noise.

The inventors have shown that, by using the decomposition of the waveform $s_k(t)$ in terms of the modulation coefficients $c_l^{(k)}$ as given by the equation (Eq-3), the received signal can be written as $$y(t) = \sum_{m=-\infty}^{+\infty} c_m^{(k)} \int_0^{+\infty} h(\tau) e^{2j\pi m \frac{t-\tau}{T_s}} d\tau + w(t) =$$

$$\sum_{m=-\infty}^{+\infty} c_m^{(k)} \left( \int_0^{+\infty} h(\tau) e^{-2j\pi m \frac{\tau}{T_s}} d\tau \right) e^{2j\pi m \frac{t}{T_s}} + w(t) = \sum_{m=-\infty}^{+\infty} c_m^{(k)} H_m e^{2j\pi m \frac{t}{T_s}} + w(t)$$

where the coefficients $$H_m = \int_0^{+\infty} h(\tau) e^{-2j\pi m \frac{\tau}{T_s}} d\tau$$

represent the transmission channel.

It can thus be seen that the decomposition of the received signal (which is a signal with finite temporal support just like the waveform $s_k(t)$ as well as the equivalent baseband impulse response h(t) in practice) leads to Fourier coefficients being expressed, once the receiver is temporally synchronized, as $$\frac{1}{T_s} \int_0^{T_s} y(t) e^{-2j\pi n \frac{t}{T_s}} dt =$$

$$\frac{1}{T_s} \sum_{m=-\infty}^{+\infty} c_m^{(k)} H_m \int_0^{T_s} e^{2j\pi \frac{(m-n)t}{T_s}} dt + \frac{1}{T_s} \int_0^{T_s} w(t) e^{-2j\pi n \frac{t}{T_s}} dt$$

Now, $$\int_0^{T_s} e^{2j\pi \frac{(m-n)t}{T_s}} dt = T_s \delta(m-n),$$

with δ(t) being the Dirac distribution. It can thus be seen that $$\frac{1}{T_s} \int_0^{T_s} y(t) e^{-2j\pi n \frac{t}{T_s}} dt = H_n c_n^{(k)} + W_n \text{ with } W_n = \frac{1}{T_s} \int_0^{T_s} w(t) e^{-2j\pi n \frac{t}{T_s}} dt.$$

It is also known to those skilled in the art that the Fourier coefficients of a given signal can be approximated by the application of a discrete Fourier transform to this very same signal.

Indeed, with M samples of y(t), i.e. y(mΔT) for m∈[0, M−1] obtained by sampling the signal y(t) at the rate 1/ΔT=M/$T_s'$, the average obtained by discrete Fourier transform $$\frac{1}{M}\sum_{m=0}^{M-1} y(m\Delta T)e^{-2j\pi\frac{nm}{M}}$$

tends towards $$\frac{1}{T_s}\int_0^{T_s} y(t)e^{-2j\pi n \frac{t}{T_s}} dt$$

when M tends towards infinity.

Thus, in a first embodiment wherein the Fourier transform module 703 implements a forward Fourier transformation on M elements, the sample of index n among the N samples $Y_l$, l varying in the set $S_\eta$, delivered by this first Fourier transform module 703 is then expressed as $$Y_n = H_n c_n^{(k)} + W_n \tag{Eq-9}$$

However, it can be seen that the waveform $s_k(t)$ can be expressed alternatively as a function of the modulation coefficients $c_l^{(k)}$ as $$s_k(t) = \sum_{n=-\infty}^{+\infty} c_{-n}^{(k)} e^{-2j\pi n \frac{t}{T_s}} \tag{Eq-3a}$$

when the change of index from n to −n is made in the equation (Eq-3).

Thus, in a second embodiment in which the Fourier transform module 703 implements an inverse Fourier transform on M elements, it can be seen, in using this alternative decomposition for the waveform $s_k(t)$, that the sample of index n among the N samples $Y_l$, with l varying in a set $S_\eta$ whose cardinal $|S_\eta|$ is equal to N, that are delivered by this first Fourier transform module 703, is then expressed as $$Y_n = H_n c_{-n}^{(k)} + W_n \tag{Eq-9a}$$

with $H_n$ and $W_n$ corresponding in this case to the samples taken at the frequencies that are multiples of $M/T_s$ of the inverse Fourier transform of h(t) and w(t) respectively.

Besides, it can be seen in both embodiments cited here above that the Gaussian assumption for the additive noise w(t) remains true for the samples $W_l$ obtained at output from the discrete Fourier transform module 703, the Fourier transformation of a Gaussian distribution giving another Gaussian distribution.

Thus, an optimal receiver structure can be derived in terms of maximum likelihood.

More specifically, in the first embodiment mentioned here above (forward Fourier transform), the rank of the symbol carried by the received signal corresponds to the index k, which maximizes the probability of the sent symbol conditional on the signal observed at reception or, in terms of a Gaussian density, it corresponds to the index k minimizing the argument of the Gaussian function. Starting from the equation (Eq-9), it can then be seen that the rank of the symbol carried by the received signal corresponds to the index k maximizing the quantity.

$$\sum_{n\in S_\eta} |Y_n - H_n c_n^{(k)}|^2$$

This expression is obtained by using the property, as Gaussian independent and identically distributed random variables, of the samples $W_n$ resulting from the projection of a Gaussian noise on an orthonormated base.

Thus, after development of the modulus squared, the rank of the symbol corresponding to the received signal is expressed as a function of the index k maximizing the quantity $$\Re\left\{\sum_{n\in S_\eta} H_n^* c_n^{(k)*} Y_n\right\}$$

On the basis of the equation (Eq-5), the modulation coefficients $c_l^{(k)}$ associated with the waveform carrying the symbol of rank k in the constellation of symbols can be expressed as a function of the reference modulation coefficients $c_l^{(r)}$ associated with the reference waveform carrying a reference symbol of rank r. Thus, it can be seen that the rank of the symbol corresponding to the received signal is expressed as a function of the index k maximizing the quantity $$\Re\left\{\sum_{n\in S_\eta} Y_n H_n^* c_n^{(r)*} e^{2j\pi \frac{n(k-r)}{N_s}}\right\}$$

More specifically, the rank of the symbol corresponding to the received signal is expressed as being equal to r plus the index k maximizing the quantity $$\Re\left\{\sum_{n\in S_\eta} Y_n H_n^* c_n^{(r)*} e^{2j\pi \frac{nk}{N_s}}\right\} \tag{Eq-10}$$

the sum of the two indices r and k being taken modulo $N_s$.

In the same way, returning to the computation described here above but this time on the basis of the equation (Eq-9a) so as to derive the optimal receiver in terms of maximum likelihood in the context of the second embodiment mentioned here above (inverse Fourier transform) and considering also the expression of the modulation coefficient of index −n, $c_{-n}^{(k)}$, obtained through the changing of the variable from n to −n in the equation (Eq-5), it can be seen that the rank of the symbol corresponding to the received signal is expressed as being equal to r plus the index k maximizing the quantity $$\Re\left\{\sum_{n\in S_\eta} Y_n H_n^* c_{-n}^{(r)*} e^{-2j\pi \frac{nk}{N_s}}\right\} \tag{Eq-10a}$$

the sum of the two indices r and k being taken modulo $N_s$.

Thus, on the basis of the equations (Eq-10) and (Eq-10a), the demodulation of the received signal in terms of maximum likelihood is obtained by implementing the steps described here below in the two embodiments mentioned here above.

More specifically, at an obtaining step E81, $N=|S_n|$ reference modulation coefficients $c_l^{(r)}$ delivered by the device 707 for storing modulation coefficients are obtained.

The N reference modulation coefficients $c_l^{(r)}$ are obtained here according to the technique described here above with reference to the step E40 illustrated in FIG. 4. In particular, in one embodiment, the N reference modulation coefficients result from the Fourier series decomposition of the reference waveform, delivering a set of initial coefficients, and the selection of a set of N reference modulation coefficients among the initial coefficients. In one variant, the selection of N reference modulation coefficients is made at least as a function of an energy-loss minimizing criterion. Thus, the distortion of the reference waveform is minimal and so is the loss of associated information.

Then, in the first embodiment mentioned here above (forward Fourier transform), at a determining step E82, the generating module 705 then determines $N_S \leq N$ decision components $D_l$, l being an integer from 0 to Ns−1. Each of the Ns decision components $D_l$ then corresponds to the real part of a sample obtained at output of an inverse discrete Fourier transform applied to the vector constituted by the N samples delivered by the complex multiplier 704 (i.e.

$$D_l = \Re\left\{\sum_{n \in S_\eta} Y_n H_n^* c_n^{(r)*} e^{2j\pi \frac{nl}{N_S}}\right\}$$

according to the equation (Eq-10)). More particularly, the sample of index n delivered by the complex multiplier 704 is expressed as $Y_n H_n^* c_n^{(r)*}$, with $H_n$ being the channel coefficient of index n among the N channel coefficients $H_l$ delivered by the channel estimator 708 during the implementing of a step E85 described here below and $c_n^{(r)}$ being the reference modulation coefficient of index n delivered by the device 707 for storing modulation coefficients during the implementation of the obtaining step E81.

At a decision step E83, the estimated value $\hat{k}$ of the rank of the symbol carried by the received signal is then expressed as a function of the decision component, of index k, denoted as the component $D_k$, presenting an extremum value among the Ns decision components $D_l$ determined at the step E82. More specifically, it is decided that the estimated value $\hat{k}$ is equal to $$\hat{k} = r + \underset{k}{\mathrm{argmax}}\{D_k\}[N_S]$$

where [.] designates the modulo function.

It can be seen that the optimal receiver in terms of maximum likelihood is based here on the use of two discrete Fourier transformation operations that can be implemented in the form of fast Fourier transforms. Indeed, it is convenient to choose in practice M=N, and N as a multiple of Ns, both preferably chosen as powers of two. Thus, the processing operations according to the technique described remain proportional to $N_S \ln(N_S)$ operations whereas they are proportional to $N_S^2$ when the Ns correlations required by the optimal receiver in terms of maximum likelihood are implemented according to the known techniques.

In the same way, in the second embodiment mentioned here above (inverse Fourier transform), during the determining step E82, the generation module 705 then determines the Ns decision components $D_l$, each of them then corresponding to the real part of a sample obtained at output of a forward discrete Fourier transform applied to the vector constituted by the N samples $Y_n H_n^* c_{-n}^{(r)*}$ delivered by the complex multiplier 704

$$\text{(i.e. } D_l = \Re\left\{\sum_{n \in S_\eta} Y_n H_n^* c_n^{(r)*} e^{-2j\pi \frac{nl}{N_S}}\right\}$$

according to the equation (Eq-10a)).

At a decision step E83, the estimated value $\hat{k}$ of the rank of the symbol carried by the received signal is decided as being equal to $$\hat{k} = r + \underset{k}{\mathrm{argmax}}\{D_k\}[N_S]$$

where [.] designates the modulo function.

It can also be seen that, in the embodiments described here above, the implementing of the steps E81, E82 and E83 imply knowledge of the N channel coefficients $H_l$.

At a step E85, the channel coefficients $H_l$ are obtained.

In one embodiment, the method of demodulation of a PPM modulated signal described is optimized for a transmission channel that is reduced to an additive white Gaussian noise or AWGN. In this case, the impulse response of the channel h(t) is reduced to only one Dirac distribution. This leads to considering the $N=|S_n| \geq N_S$ channel coefficients $H_l$ equal to 1 (these channel coefficients correspond to a Fourier transform of the impulse response of the channel).

In another embodiment, the obtaining step E85 implements an estimation sub-step $E85_1$ for estimating the channel coefficients by the channel estimator 708 on the basis of the $N=|S_n| \geq N_S$ samples $Y_l$ delivered by the discrete Fourier transform module 703 and the rank of the corresponding received symbol, this signal possibly corresponding to a predetermined symbol (e.g. a preamble or a symbol of a learning sequence) or a symbol (e.g. data symbol) preliminarily decided by the decision module 306 during a preliminary execution of the step E83.

More particularly, the channel coefficients $H_l$ are determined by the implementing of a technique known to those skilled in the art of estimation of channels in the frequency domain as described for example in the documents «M. K. Ozdemir and H. Arslan, "*Channel estimation for wireless ofdm systems*," in *IEEE Communications Surveys & Tutorials*, vol. 9, no. 2, pp. 18-48, Second Quarter 2007», or «Srishtansh Pathak and Himanshu Sharma, "*Channel Estimation in OFDM Systems*", in *International Journal of Advanced Research in Computer Science and Software Engineering*, Volume 3, Issue 3, March 2013, ISSN: 2277 128X».

In one variant, r is null and the modulation coefficients $c_n^{(r)}$ of the reference waveform $s_r(t)$ used to implement the steps of the method for demodulating a PPM modulated signal described here above (in any one of the different embodiments) correspond to the modulation coefficients $c_n^{(0)}$ of the basic waveform $s_0(t)$.

In another variant, Ns as well as N and M are expressed as a power of two. Thus, the discrete Fourier transforms implemented respectively in the discrete Fourier transform module 703 and in the generation module 705 can be implemented as fast Fourier transforms according to a particularly efficient algorithm.

In yet another variant, the basic waveform used at an instantaneous frequency, varies linearly between a first instantaneous frequency f0 and a second instantaneous frequency f1 for a duration Ts, and the instantaneous frequency f1 is chosen such that $f_1=-f_0$, as for example in the case of a raw chirp signal used in the LoRa® technology and described here above with reference to FIGS. 2a and 2b. The modulation coefficients $c_n^{(0)}=c_n$ are then given by the equation (Eq-6).

It will be noted that, during the RF demodulation, it is still possible to choose a carrier frequency in such a way that $f_1=-f_0$.

Figure 9:
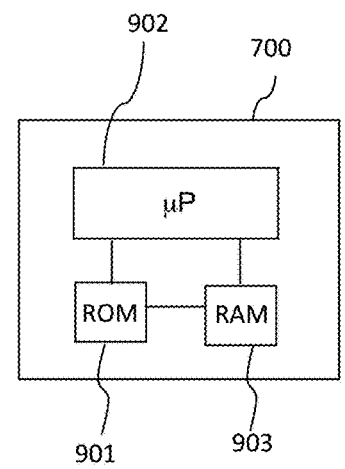
FIG. 9 illustrates an example of a structure of a device for demodulating a PPM modulated signal according to different embodiments of the invention.

FIG. 9 represents an example of a structure of a PPM-modulated signals demodulation device enabling the implementing of a method of demodulation described with reference to FIG. 8 according to different embodiments of the invention.

The device 700 for demodulating PPM-modulated signals comprises a random-access memory 903 (for example an RAM), a processing unit 902 equipped for example with a processor and managed by a computer program stored in a read-only memory 901 (for example a ROM or a hard-disk drive). At initialization, the code instructions of the computer program are for example loaded into the random-access memory 903 and then executed by the processor of the processing unit 902.

This FIG. 9 also illustrates one particular way, among several possible ways, of making the device 700 for demodulating PPM modulated signals 700 so that they carry out certain steps of the method described in detail here above with reference to FIG. 8 (in any one of its different embodiments). Indeed, these steps can be carried out equally well on a re-programmable computing machine (a PC, a DSP or a microcontroller) executing a program comprising a sequence of instructions or on a dedicated computing machine (for example a set of logic gates such as an FPGA or an ASIC or any other hardware module).

Should the device 700 for demodulating PPM modulated signals be made with a programmable computing machine, the corresponding program (i.e. the sequence of instructions) could be stored in a detachable storage medium (such as for example a floppy disk, a CD-ROM or a DVD-ROM) or non-detachable storage medium, this storage medium being partially or totally readable by a computer or a processor.

The invention claimed is:

1. A method for generating a pulse-position-modulated signal,
    said modulated signal comprising a temporal succession of waveforms among Ns waveforms,
    an s-th waveform among said Ns waveforms being associated with a k rank symbol of a constellation of Ns symbols, k being an integer from 0 to Ns−1,
    said s-th waveform resulting from a circular permutation of the pattern of variation of a basic waveform over a duration Ts, obtained by a time shift of k times an elementary time duration Tc such that Ns*Tc=Ts,
    wherein the method comprises the following steps, executed by a modulation device:
    for a k rank symbol of the constellation of Ns symbols: obtaining a set of N modulation coefficients $c_l^{(k)}$, l being an integer varying in a set $S_n$ sized N,
    a modulation coefficient of index n among said N modulation coefficients, denoted as $c_n^{(k)}$, being expressed as the product of a reference modulation coefficient of index n, denoted as $c_n^{(r)}$, multiplied by a phase-shift term of which the argument is proportional to n,
    said modulation coefficient referenced $c_n^{(r)}$ coming from the Fourier series decomposition of a reference waveform among said Ns waveforms, associated with a symbol of rank r,
    generating M temporal samples of a k-th waveform by forward or inverse Fourier transform of said set of N modulation coefficients $c_l^{(k)}$; and
    using said generated M temporal samples to modulate a radiofrequency carrier, and
    sending a resulting radiofrequency modulated signal to a radiofrequency (RF) transmitter for transmission over a transmission channel.

2. The method for generating according to claim 1,
    wherein the step of obtaining said set of N modulation coefficients implements the following sub-steps for said modulation coefficient $c_n^{(k)}$ of said set:
    reading, in a first storage device, of said reference modulation coefficient $c_n^{(r)}$ coming from said Fourier series decomposition of said basic waveform,
    multiplication of said reference modulation coefficient $c_n^{(r)}$ by said phase-shift term, the argument of which is proportional to n, said multiplication delivering said modulation coefficient $c_n^{(k)}$.

3. The method for generating according to claim 1,
    wherein the step of obtaining said set of N modulation coefficients implements a step of the reading, in a second storage device, of said preliminarily computed modulation coefficients $c_l^{(k)}$.

4. The method for generating according to according to claim 1,
    wherein said reference modulation coefficients $c_l^{(r)}$ are obtained by implementing the following steps:
    Fourier series decomposition of said reference waveform delivering a set of initial coefficients,
    selection of a set of N reference modulation coefficients among said initial coefficients, at least as a function of an energy-loss minimizing criterion.

5. The method for generating according to according to claim 1,
    wherein said phase-shift term is proportional to:

$$e^{-2j\pi n \frac{k}{N_s}}$$

when said Fourier transform is an inverse Fourier transform, or $$e^{+2j\pi n \frac{k}{N_s}}$$

when said Fourier transform is a forward Fourier transform.

6. The method for generating according to according to claim 1,
    wherein said set of N modulation coefficients $c_l^{(k)}$ forms a modulation vector and in that, if the number M of temporal samples is greater than the number N of modulation coefficients $c_l^{(k)}$, then (M−N) null elements are added to said modulation vector.

7. The method according to claim 1,
wherein said basic waveform has an instantaneous frequency that varies linearly between a first instantaneous frequency f0 and a second instantaneous frequency f1 for the duration Ts, the second instantaneous frequency being chosen such that $f_1=-f_0$,
and in that said reference modulation coefficient $c_n^{(r)}$ is given by $$c_n^{(r)} = 2(-1)^n(-j)^{\frac{N_S}{4}} e^{-2j\pi n \frac{r}{N_S}} \int_0^{\frac{1}{2}} e^{j\pi N_S v^2} \cos(2\pi n v) dv.$$

8. The method for generating according to claim 1, transmitting the resulting radiofrequency modulated signal over a transmission channel by the RF transmitter.

9. A method comprising the following steps executed by a demodulating device:
receiving a modulated signal from a transmission channel with a radiofrequency (RF) receiver, the modulated signal resulting from a pulse-position modulation of a signal and from a transmission of the modulated signal in the transmission channel,
said modulated signal comprising a temporal succession of waveforms among Ns waveforms,
a k-th waveform among said Ns waveforms being associated with a k rank symbol of a constellation of Ns symbols, k being an integer from 0 to Ns−1,
said k-th waveform resulting from a circular permutation of the pattern of variation of a basic waveform over a duration Ts, obtained by a time shift of k times an elementary time duration Tc, such that Ns*Tc=Ts; and
for M samples representing a waveform included in said modulated signal:
applying forward or inverse Fourier transformation to said M samples of said received signal and delivering N transformed samples Y, l being an integer varying in a set $S_\eta$ sized N;
obtaining of a set of N modulation coefficients $c_l^{(k)}$, l being an integer varying in the set $S_\eta$,
a modulation coefficient of index n among said N modulation coefficients, denoted as $c_n^{(k)}$, being expressed as the product of a reference modulation coefficient of index n, denoted as $c_n^{(r)}$, multiplied by a phase-shift term the argument of which is proportional to n,
said reference modulation coefficient $c_n^{(r)}$ coming from the Fourier series decomposition of a reference waveform among the Ns waveforms associated with a symbol of rank r,
said set of N modulation coefficients or said reference modulation coefficients being stored in a storage device, thereby reducing at least one of a number of calculations performed by the demodulating device or consumption of storage space of the storage device;
determining Ns decision components from said N transformed samples and N modulation coefficients obtained,
a decision component of index l, denoted as a component $D_l$, being expressed as a function of a forward or inverse Fourier transform of N terms with l being an integer from 0 to Ns−1,
a term of index n among said N terms, n an integer varying in the set $S_\eta$ being a function of a product of a transformed sample $Y_n$ multiplied by said obtained reference modulation coefficient $c_n^{(r)}$ or by the conjugate complex of said obtained reference modulation coefficient;
deciding on the rank $\hat{k}$ of the symbol carried by the waveform associated with said M samples, on the basis of the decision component having an extremum value among said Ns decision components, of index k, denoted as $D_k$; and
outputting the symbol with the decided rank $\hat{k}$.

10. The method for demodulating according to claim 9,
wherein said reference modulation coefficients $c_l^{(r)}$ are obtained by implementing the following steps:
Fourier series decomposition of said reference waveform, delivering a set of initial coefficients,
selecting a set of N reference modulation coefficients among said initial coefficients, at least as a function of an energy-loss minimizing criterion.

11. The method for demodulating according to claim 9,
wherein the Fourier transform applied to said the M samples of the received signal is a forward transform,
wherein the method comprises a step of obtaining (E85) N parameters representing the transmission channel,
and wherein said k-th component $D_k$ is expressed in a form proportional to the real part of $$\sum_{n \in S_\eta} Y_n H_n^{*'} c_n^{(r)*} e^{2j\pi \frac{nk}{N_S}},$$

or of its conjugate complex,
with $H_n{'}$, n an integer varying in the set $S_\eta$ being a parameter representing the transmission channel, obtained by applying a forward Fourier transform to N time samples of the impulse response of said channel.

12. The method for demodulating according to claim 9,
wherein the Fourier transform applied to the M samples of said received signal is an inverse transform,
wherein the method comprises a step of obtaining N parameters representing the transmission channel,
and wherein said k-th component $D_k$ is expressed in a form proportional to the real part of $$\sum_{n \in S_\eta} Y_n H_n^{*\circ} c_{-n}^{(r)*} e^{-2j\pi \frac{nk}{N_S}},$$

or of its conjugate complex,
with $H_n^\circ$, n being an integer varying in the set $S_\eta$, a parameter representing the transmission channel, obtained by applying an inverse Fourier transform to Ns time samples of the impulse response of said channel.

13. The method according to claim 9,
wherein said basic waveform has an instantaneous frequency varying linearly between a first instantaneous frequency f0 and a second instantaneous frequency f1 for the duration Ts, the second instantaneous frequency f1 being chosen such that $f_1=-f_0$,
and in that said reference modulation coefficient $c_n^{(r)}$ is given by $$c_n^{(r)} = 2(-1)^n(-j)^{\frac{N_S}{4}} e^{-2j\pi n \frac{r}{N_S}} \int_0^{\frac{1}{2}} e^{j\pi N_S v^2} \cos(2\pi n v) dv.$$

14. A non-transitory computer-readable medium comprising a computer program product stored thereon comprising program code instructions for implementing a method of generating a pulse-position-modulated signal, when said program is executed on a processor of a modulating device,
said modulated signal comprising a temporal succession of waveforms among Ns waveforms,
an s-th waveform among said Ns waveforms being associated with a k rank symbol of a constellation of Ns symbols, k being an integer from 0 to Ns−1,
said s-th waveform resulting from a circular permutation of the pattern of variation of a basic waveform over a duration Ts, obtained by a time shift of k times an elementary time duration Tc such that Ns*Tc=Ts,
wherein the method comprises the following steps, executed by the modulation device:
for a k rank symbol of the constellation of Ns symbols:
obtaining a set of N modulation coefficients $c_l^{(k)}$, l being an integer varying in a set $S_n$ sized N,
a modulation coefficient of index n among said N modulation coefficients, denoted as $c_n^{(k)}$, being expressed as the product of a reference modulation coefficient of index n, denoted as $c_n^{(r)}$, multiplied by a phase-shift term of which the argument is proportional to n,
said modulation coefficient referenced $c_n^{(r)}$ coming from the Fourier series decomposition of a reference waveform among said Ns waveforms, associated with a symbol of rank r,
generating M temporal samples of a k-th waveform by forward or inverse Fourier transform of said set of N modulation coefficients $c_l^{(k)}$; and
using said generated M temporal samples to modulate a radiofrequency carrier, and
sending a resulting radiofrequency modulated signal to a radiofrequency transmitter (RF) for transmission in a transmission channel.

15. A device for generating a pulse-position modulated signal,
said modulated signal comprising a temporal succession of waveforms among Ns waveforms,
a k-th waveform among said Ns waveforms being associated with a k rank symbol of a constellation of Ns symbols, k being an integer from 0 to Ns−1,
said k-th waveform resulting from a circular permutation of the pattern of variation of a basic waveform over a duration Ts, obtained by a time shift of k times an elementary time duration Tc such that Ns*Tc=Ts,
wherein the device comprises a reprogrammable computing machine or a dedicated computing machine configured to:
obtain a set of N modulation coefficients $c_l^{(k)}$, l being an integer varying in a set $S_n$,
a modulation coefficient of index n among the N modulation coefficients, denoted as $c_n^{(k)}$ being expressed as the product of a reference modulation coefficient of index n, denoted as $c_n^{(r)}$, multiplied by a phase-shift term, the argument of which is proportional to n,
said reference modulation coefficient $c_n^{(r)}$ coming from the Fourier series decomposition of a reference waveform among the Ns waveforms associated with a symbol of rank r;
generate M time samples of a k-th waveform by forward or inverse Fourier transformation of said set of N modulation coefficients $c_l^{(k)}$;
use said generated M time samples to modulate a radiofrequency carrier; and
send the resulting radiofrequency modulated signal to a radiofrequency (RF) transmitter for transmission in a transmission channel.

16. An apparatus comprising:
a radiofrequency (RF) receiver; and
a reprogrammable computing machine or a dedicated computing machine, configured to:
receive a modulated signal from a transmission channel with the radiofrequency (RF) receiver, the received modulated signal resulting from a pulse-position modulation of a signal, transmission of the modulated signal in the transmission channel, and reception of the transmitted modulated signal by the RF receiver,
said modulated signal comprising a temporal succession of waveforms among Ns waveforms,
a k-th waveform among said Ns waveforms being associated with a k rank symbol of a constellation of Ns symbols, k being an integer from 0 to Ns−1,
said k-th waveform resulting from a circular permutation of the pattern of variation of a basic waveform over a duration Ts, obtained by a time shift of s times an elementary time duration Tc such that Ns*Tc=Ts,
demodulate the modulated signal by:
applying a forward or inverse Fourier transformation to the M samples of the received signal and delivering N transformed samples $Y_l$, l being an integer varying in a set $S_n$ sized N;
obtaining a set of N modulation coefficients $c_l^{(k)}$, l being an integer varying in the set $S_n$,
a modulation coefficient of index n among the N modulation coefficients denoted as $c_n^{(k)}$, being expressed as the product of a reference modulation coefficient of index n, denoted as $c_n^{(r)}$, multiplied by a phase-shift term the argument of which is proportional to n,
said reference modulation coefficient $c_n^{(r)}$ coming from the Fourier series decomposition of a reference waveform, among the Ns waveforms, associated with a symbol of rank r,
said set of N modulation coefficients or said reference modulation coefficients being stored in a storage device, thereby reducing at least one of a number of calculations performed by the apparatus or consumption of storage space of the storage device;
determining Ns decision components from the N transformed samples,
a decision component of index l, denoted as the component $D_l$, being expressed as a function of a forward or inverse Fourier transform of N terms, with l being an integer from 0 to Ns−1,
a term of index n among said N terms, n being an integer varying in the set $S_n$, being a function of a product of a transformed sample $Y_n$ multiplied by an obtained reference modulation coefficient $c_n^{(r)}$ or multiplied by the complex conjugate of said obtained reference modulation coefficient;
deciding the rank k̃ of the symbol carried by the waveform associated with said M samples, from the decision component presenting an extremum value among the Ns decision components, of index k, denoted as the component $D_{\tilde{k}}$; and
outputting the symbol with the decided rank k̃.

17. A non-transitory computer-readable medium comprising a computer program product stored thereon comprising program code instructions for implementing a method of demodulating a received modulated signal, when said program is executed on a processor of a demodulating device, wherein the instructions configure the demodulating device to:

receive a modulated signal from a transmission channel with a radiofrequency (RF) receiver, said received modulated signal resulting from a pulse-position modulation of a signal, transmission of the modulated signal in the transmission channel and reception of the transmitted modulated signal by the RF receiver, said modulated signal comprising a temporal succession of waveforms among Ns waveforms, a k-th waveform among said Ns waveforms being associated with a k rank symbol of a constellation of Ns symbols, k being an integer from 0 to Ns−1, said k-th waveform resulting from a circular permutation of the pattern of variation of a basic waveform over a duration Ts, obtained by a time shift of k times an elementary time duration Tc, such that Ns*Tc=Ts, perform the following steps for M samples representing a waveform included in said modulated signal:

applying forward or inverse Fourier transformation to said M samples of said received signal and delivering N transformed samples $Y_l$, l being an integer varying in a set $S_n$ sized N;

obtaining of a set of N modulation coefficients $c_l^{(k)}$, l being an integer varying in the set $S_n$, a modulation coefficient of index n among said N modulation coefficients, denoted as $c_n^{(k)}$, being expressed as the product of a reference modulation coefficient of index n, denoted as $c_n^{(k)}$, multiplied by a phase-shift term the argument of which is proportional to n, said reference modulation coefficient $c_n^{(r)}$ coming from the Fourier series decomposition of a reference waveform among the Ns waveforms associated with a symbol of rank r, said set of N modulation coefficients or said reference modulation coefficients being stored in a storage device, thereby reducing at least one of a number of calculations performed by the demodulating device or consumption of storage space of the storage device;

determining Ns decision components from said N transformed samples and N modulation coefficients obtained, a decision component of index l, denoted as a component $D_l$, being expressed as a function of a forward or inverse Fourier transform of N terms with l being an integer from 0 to Ns−1, a term of index n among said N terms, n an integer varying in the set $S_n$ being a function of a product of a transformed sample $Y_n$ multiplied by said obtained reference modulation coefficient $c_n^{(r)}$ or by the conjugate complex of said obtained reference modulation coefficient;

deciding on the rank $\hat{k}$ of the symbol carried by the waveform associated with said M samples, on the basis of the decision component having an extremum value among said Ns decision components, of index k, denoted as $D_k$; and outputting the symbol with the decided rank $\hat{k}$.

* * * * *